United States Patent
Loehden et al.

(12) 
(10) Patent No.: US 6,498,209 B1
(45) Date of Patent: Dec. 24, 2002

(54) POLY(METH)ACRYLATE PLASTISOLS

(75) Inventors: Gerd Loehden, Hanau (DE); Pavel Belik, Rodenbach (DE); Klaus Dorn, Hanau (DE); Natascha Schickel, Gelinhausen (DE); Mauren Traebing, Hanau (DE); Georg Schneider, Freigericht (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 09/717,393

(22) Filed: Nov. 20, 2000

(30) Foreign Application Priority Data

Mar. 31, 1998 (DE) .......................................... 198 14 264

(51) Int. Cl.[7] .............................. C08J 3/00; C08K 3/00; C08K 3/34; C08K 11/00; C08L 33/06

(52) U.S. Cl. ........................ 524/561; 524/401; 524/442
(58) Field of Search ................................. 524/561, 401, 524/442

(56) References Cited

U.S. PATENT DOCUMENTS 5,324,762 A * 6/1994 Overend et al.

* cited by examiner

*Primary Examiner*—Patrick D. Niland
(74) *Attorney, Agent, or Firm*—Oblon, Spivak, McClelland, Maier & Neustadt, P.C.

(57) ABSTRACT

There are provided plastisols based on poly(meth)acrylate which have a mean molecular weight in excess of 3,500,000 which have superior shelf life, tensile strength extensibility and viscosity as well as gel formation and filmforming propeties to those known heretofore. These plastisols are formed by emulsion polymerization.

13 Claims, No Drawings

POLY(METH)ACRYLATE PLASTISOLS

RELATED APPLICATIONS

This application is a continuation in part of Applicants' application U.S. Ser. No. 09/277,931 filed Mar. 29, 1999, now abandoned, claiming priority of German Application No. 198 14 264.1 filed Mar.31, 1998.

BACKGROUND OF THE INVENTION

The invention is directed to new plastisols with improved qualities, as well as to the use of advantageous (meth) acrylate resin masses for the production of these new plastisols.

Plastisols are generally found as a two-phase system having one component as a plastic (binding material) and the second as a suitable softening agent. As a matter of principle, a large variety of different plastics are usable as binding materials. However, from a technical point of view, only rather few plastics are actually utilized. By far, the most important class of polymers that is utilized for this purpose are derived from polyvinyl chloride (PVC). However, from the point of view of environment considerations, the utilization of PVC is undesirable. The danger of dioxin formation in the case of fire and the corresponding contamination of the surroundings militates against the utilization of PVC.

For this reason, attempts have been made to create plastisols based on poly(meth)acrylates. See for example, DE-PS 934 498, FR-A 2,291,248 and EP 0 774 483 A2. As used herein, the terminology (meth)acrylates includes both acrylates and methacrylates.

A fundamental problem associated with the use of poly (meth)acrylate plastisols in comparison to PVC plastisols rests in their insufficient shelf-life and mechanical properties. The use of spray-dried emulsion polymerisates based on PMMA in accordance with the state of the art, leads in combination with commercially available softening agents to good gelation and film properties, but also to reduced storage stability—the products already gel after comparatively short time at room temperature which can be recognized by an increase in viscosity.

The problem of storage capacity was attempted to be solved as disclosed in EP 0 774 483, by raising the amount of the middle sized particles by providing milled-suspension polymerisates to the usual emulsion polymerisates. The disadvantage of this procedure is in the circumstance that the higher particle size leads to impeded gelling of the plastisols, since under certain circumstances, the larger suspension polymerisates no longer gel completely which this technology demands. The inhomogeneity of the films caused by the incomplete gelation gives rise to insufficient mechanical properties with respect to tensile strength (resistance to tearing) in the corresponding films. Furthermore, one must not ignore the optical disadvantage of these inhomogeneous films in the formation of smooth surfaces. In order to achieve the production and reduction in size of the suspension polymerisates, additional procedural steps are required which lead to increase in cost of the product.

Furthermore, the art similarly requires the lowest possible viscosity level for the plastisol. On the one hand, it is desirable to cover the broadest possible spectrum of processing techniques and thus cover the widest possible area of usage. On the other hand, plastisols should desirably be processable at the lowest possible temperature and only after warming and subsequently cooling, should the plastisol gel to a solid uniform film.

The state of the art describes the use of emulsion polymerisates up to a molecular weight of 2,000,000 g/mol (EP 0 539 031 A1). For technically usual PMMA plastisols, there are utilized emulsion polymerisates of a substantially lower (less than 500,000 g/mol) molecular weight.

Heretofore, the state of the art does not describe polymerisates and/or copolymerisates of the utilized (meth) acrylate with such high chain lengths for the formation of plastisols. Thus, there is no suggestion to one skilled in the art that by utilizing polymerisates and/or copolymerisates of (meth)acrylates of such high molecular weight, one could obtain the above-described advantageous plastisols. On the contrary, one skilled in the art would be under the impression that by raising the molecular weight and therewith chain length polymers, there would be obtained an increase in the viscosity of the plastisols. In fact, as is shown in Table 1 hereof, what occurs is the exact reverse.

The task of the present invention is to find a plastisol that combines good film qualities and gel formability which lead to good tensile strength and break/extension properties of the product with acceptable storage stability and low viscosity. These and further named tasks, which will be clear to one skilled in the art from the state of the art, are solved by plastisol defined by claim 1 hereof.

SUMMARY OF THE INVENTION

Advantageous embodiments of the invention are set forth in claims relating back to claim 1. Uses of plastisols in accordance with the present invention are described in the corresponding claims.

These plastisols show:

1. Polymerisates and/or copolymerisates of (meth) acrylates obtainable by the polymerization of mixtures containing, as polymerizable components:
   (A) 20 to 100 wt. % methylmethacrylate.
   (B) 0 to 80 wt. % of (meth)acrylates different from methylmethacrylate, having formula I:

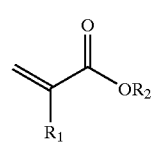

(I)

wherein
   $R_1$ is hydrogen or methyl, and
   $R_2$ is a linear or branched ($C_1$–$C_{18}$) alkyl residue.
   (C) 0 to 40 wt. % of further monomers different from (A) and (B),
   (D) 0 to 40 wt. % of adhesion causing monomer, wherein (A) through (D) yield 100 wt. % of the polymerizable components.

II. A compatible softening agent in the proportion of 5 to 400 parts by weight, relative to 100 wt. % of polymerisate and/or copolymerisate I.

III. Inorganic fillers in the amount of 9 to 700 parts by weight, relative to 100 parts by weight of component I, characterized thereby that the mean molecular weight $M_w$ of the poly-merisate and/or copolymerisate of the (meth)acrylate is greater than 3,500,000 g/mol, enables one to provide, a particularly advantageous and yet surprisingly stable plastisol having low viscosity which, because of homogeneous film formation on gelation, show excellent mechanical as well as optical properties. The polymerisate and/or copolymerisates are preferably obtained through emulsion polymerization.

Under normal circumstances, a rise in molecular weight, that is to say chain length, in solutions or emulsions of polymer, leads to a faster separation of mixtures and thus a poorer storage life. However, contrary to expectations, the storage stability of plastisols improves with the increase in chain length. In the plastisols of the present invention, one observes a far lower level of mixture separation than with plastisols formed with polymerisates of the state of the art.

Especially preferred in the plastisols of the present invention based on (meth)acrylate, are those wherein the residue $R_2$ of the (meth)acrylate of formula I is a linear or branch chained ($C_1$–$C_8$) alkyl residue.

It is particularly advantageous if the mean molecular weight $M_w$ of polymerisate and/or copolymerisate of the charged (meth)acrylate in the plastisols is greater than 3,500,000 g/mol., suitably greater than 3,900,000 g/mol.

DISCUSSION OF THE PREFERRED EMBODIMENTS

Particularly desirable for the formation of plastisols is the use of polymerisate and/or copolymerisate of the (meth) acrylate with a mean molecular weight $M_w$ of greater than 3,500,000 g/mol, preferably greater than 3,900,000 g/mol.

The term "(meth)acrylate" within the scope of the present invention includes both acrylates and methacrylates.

The chain length of the polymerisates and/or copolymerisates of the methacrylates are limited by a synthetically achievable chain lengths. Chain lengths having a mean molecular weight of $M_w$ of about 12,000,000 g/mol are achievable.

The mean molecular weight $M_w$ of polymers for use of the present invention are determined by means of SEC or GPC (size exclusion chromatography or gel permeation chromatography) relative to polystyrene standards. Those skilled in the art are familiar with SEC or GPC analysis methods for the determination of the mean molecular weight.

Within the scope of the invention, a further quantity for the characterization of the molecular mass of the charge polymerisate and/or copolymerisate is the viscosity number VZ. This viscosity number is determined by the standard set forth in DIN 51 562 Parts 1 and 3 (Revision of January 1983 and May 1985).

The polymerisates and/or copolymerisates used in the plastisols of the present invention have a VZ value equal to, or greater than 600, desirably greater than 600, preferably greater than 900, and especially preferably greater than 1200.

By the term "linear" or "branch chain ($C_1$–$C_{18}$) alkyl residue", one understands a group of alkyl residues commencing with methyl via ethyl, up to an 18 carbon atoms containing radical. Included in this group are several bonding isomers which are conceivable within the group.

Included in the different monomers of (A) and (B) are styrene and its derivatives, vinyl esters such as vinyl acetate, vinyl propionate, vinyl esters of higher alkyl acids, maleic acid anhydride, itaconic acid and its esters, and olefins such as ethylene, propylene, isobutylene, etc.

As adhesion improving monomers (HM) may be included radically polymerizable monomers which contain functional groups, which can enter into interactions with materials that are to be coated. Such interactions can occur by, for example, hydrogen bonding, complexing, dipole forces and the rest, in which, generally speaking, hetero atoms such as oxygen or nitrogen take part. There may be mentioned as functional groups amino, in particular dialkyl amino, (cyclic)amido- imido- hydroxy- oxy- carboxyl- and cyano groups. Such monomers are, generally speaking, known (see H. Rauch Puntigam, Th. Volker, (translated) Acryl- and Methacryl-compounds, Springer-Verlag, 1967; Kirk-Othmer, Encyclopedia of Chemical Technology, 3rd. Ed., Vol. 1, pp. 394–400, J. Wiley 1978; DE-A 25 56 080; DE-A 26 34 003).

Preferably, the adhesion improving monomers HM belong to a nitrogen containing class of vinyl heterocycles, suitably having 5 or 6 rings and/or copolymerizable vinyl carboxylic acids and/or hydroxyalkyl-, alkoxy-alkyl-, and aminoalkyl-substituted esters or amides of acrylic and methacrylic acids.

As nitrogen containing heterocyclic monomers of the HM group, particularly desirable are the class of vinyl imidozoles, vinyl lactams, vinyl carbazoles and vinyl pyridines. As examples, which no way should be considered to be limiting for these monomeric imidazole compounds may be mentioned N-vinyl-imidazole, (also called vinyl-1-imidazole), N-vinyl-methyl-2-imidazole. N-vinyl-ethyl-2-imidazole, N-vinyl-phenyl-2-imidazole, N-vinyl-dimethyl-2,4-imidazole, N-vinyl-benzimidazole, N-vinylimidazoline (also called vinyl-1-imidazoline), N-vinyl-methyl-2-imidazoline, N-vinyl-phenyl-2-imidazoline and vinyl-2-imidazole.

As examples of monomers which are obtained from lactams, there may be mentioned in particular N-Vinylpyrrolidone, N-Vinylmethyl-5-pyrrolidone, N-Vinylmethyl-3-pyrrolidone, N-Vinylethyl-5-pyrrolidone, N-Vinyldimethyl-5,5-pyrrolidone, N-Vinylphenyl-5-pyrrolidone, N-Allyl-pyrrolidone, N-Vinylthiopyrrolidone, N-Vinylpiperidone, N-Vinyldiethyl-6,6-piperidone, N-Vinylcaprolactam, N-Vinylmethyl-7-caprolactam, N-Vinyl-ethyl-7-caprolactam, N-Vinyl-dimethyl-7,7-caprolactam, N-Allylcaprolactame, N-Vinylcapryllactam.

Under monomers which may be derived from carbazole, there may be particular mentioned N-Vinylcarbazole, N-Allylcarbazole, N-Butenylcarbazole, N-Hexenylcarbazol and N-(Methyl-1-ethylene)carbazole. As copolymerizable vinylcarboxylic acids, there may be mentioned as particularly suitable acrylic and methacrylic acids as well as suitable salts thereof.

Further, there may be utilized as the following oxy, as well as alkoxy substituted alkyl esters of (meth)acrylic acids, in particular 2-Hydroxyethyl (meth)acrylate, Hydroxypropyl (meth)acrylate, 2-Methoxy-ethyl(meth)acrylate, 2-Ethoxyethyl(meth)acrylate, 2-Butoxyethyl(meth)acrylate, 2-(2-Butoxyethoxy)ethylmethacrylate, 2-(Ethoxyethyloxy)ethyl(meth)acrylate, 4-Hydroxybutyl(meth)acrylate, 2-[2-(2-Ethoxy-ethoxy)ethoxy]-ethyl(meth)acrylate, 3-Methoxybutyl-1-(meth)acrylate, 2-Alkoxymethylethyl (meth)acrylate, and 2-Hexoxyethyl(meth)acrylate.

Furthermore, the following amino substituted alkyl esters (meth)acrylic acids, may be mentioned 2-Dimethylamino-ethyl (meth)acrylate, 2-Diethylaminoethyl-(meth)acrylate, 3-Dimethylamino-2,2-dimethylpropyl-1-(meth)acrylate, 3-Dimethylamino-2,2-dimethylpropyl-1-(meth)acrylate, 2-Morpholinoethyl(meth)-acrylate, 2-tert.-Butylamino-ethyl(meth)acrylate, 3-(Dimethylamino)propyl-(meth) acrylate, 2-(Dimethyl-aminoethoxyethyl)-(meth)acrylate.

As examples of (meth)acrylamide, the following monomers may be mentioned N-Methyl(meth)acrylamide, N-Dimethylaminoethyl(meth)-acryl amide, N-Dimethylaminopropyl(meth)acrylamide, N-Isopropyl (meth)-acryl amide, N-tert.-Butyl(meth)acrylamide, N-Isobutyl(meth)acrylamide, N-Decyl(meth)acrylamide, N-Cyclohexyl(meth)acrylamide, N-[3-(Dimethyl-amino)2,2-dimethylpropyl]-methacrylamide, N-[2-Hydroxyethyl] (meth)-acrylamide.

The plastisols of this application contain generally known softeners W in the usual amounts, for example for PMMA plastisols (but also for PVC plastisols), in particular phthalic acid esters, adipic acid and/or sebacic acid esters, chlorinated paraffins, trialkyl phosphates, aliphatic or araliphatic polyesters, as well as various other polymeric softening agents such as urea soft resin (see H. K. Felger (Trans.), Plastics-Handbook Vol. 1/1C, Kanset-Verlag 1985 as well as in H. F. Mark, et al., Encyclopedia of Polymer Science and Engineering, Supplemental Volume, pg. 568–647, J. Wiley 1989). A selection of suitable softening agents can also be found in DE-C 25 43 542. Similarly, there may be used softening agents suitably softening agent combinations which, during a storage of the prepared plastisols for 3 weeks at 30° C., limit a rise in viscosity to 10 times, suitably only 5 times the initial viscosity. Particularly may be mentioned dioctylphthalate, diisodecyl-phthalate, diethylhexylphthalate, Di-$C_7C_{11}$-n-alkylphathlate, tricresylphos-phate, dibenzyltoluene (LIPINOL?T, Product of Fa. Huls AG), 2,2,4-trimethyl-1,3-pentandioldibenzoate (Benzoflex 354, Product of Velsicol) and benzyl-octytphtalate.

Furthermore, the plastisols may contain generally speaking, well known inorganic fillers in amounts in amounts up to 700 parts by weight (per 100 parts by weight of plastisol). There may be mentioned for example, calcium carbonate (chalk) titanium dioxide, calcium oxide, Perlite, precipitated and coated chalks as rheologically active additives, further similarly thixotroping agents such as, for example, pyrogenic silica acid. The particle size generally lies in the range of 5 to 25 1mm and furthermore the plastisols according to the intended use, may contain known active agents such as adhesive agents, cross-linking agents, stabilizers, lubricating agents, blowing agents in amounts of 0–5 wt. % (relative to the plastisols). There may also be utilized calcium stearate as a lubricating agent.

The plastisols of the present invention may be utilized for a variety of purposes such as those designated for PVC or PMMA plastisols. In particular, there may be considered walking surfaces for floor coverings, free transparent folios, KFZ underlayment protection, corrosion protection for metals, intermediate coverings for floor coverings (foamed), wallpaper, plastic sheets, car roof windows, instrument panel, coverings, crown corks.

Basically, the above-identified monomers, in particular methylmeth-acrylate as well as the monomers of Group B are useful for the core-shell polymerisates.

The construction of the polymerisate and/or copolymerisate from a core material and a shell material proceeds in a generally known manner in a particular procedure by emulsion polymerization. In this process, the monomers forming the core material are polymerized in aqueous emulsion in a first procedural step. When the monomers of the first step are substantially fully polymerized, the monomeric components of the shell material are added under such conditions to the emulsion polymerisate that formation of new particles is avoided. Thus, during the second step the thus formed polymerisate forms a shell around the core material.

In the first polymerization step in which the core material is formed, between 0.01 to 3 wt. % (relative to the monomer) of an anionic cationic or nonionic emulsifier such as sodium lauryl sulfate, alkyl benzyl sulfonate, oxy ethylation products of alkylated phenols or their neutralized sulfonation products are utilized. The polymerization suitably proceeds between 60° and 100° C. with the help of a water soluble radical source such as potassium or ammonium persulfate or hydrogen peroxide. Before the commencement of the second polymerization step, further initiator may be added. However, very mall amounts or in fact no additional emulsifier is used in the second step.

EXAMPLES

The following Examples are intended illustrate but in no way limit the scope of the invention.

The emulsion polymers are prepared by special synthetic routes, in particular by the known, so-called "semi batch" process (Addition of Emulsion) which permit high molecular weight products to be obtained. Thus the molecular weight is controlled into the desired direction by two parameters. First by the amounts of initiator (in combination with temperature. Second by the speed of addition of the monomors in the main addition. No controlling additives are utilized. The provision of comonomers as described above will be clear to one skilled in the art. By means of the choice of comonomers, the particular requirements of the technology can be obtained in an improved way. The following example 1 describes the production of Product B.

Example 1

Into a 5 L reactor of an apparatus comprising stirrer, reflux condenser, dosing pump, water bath and nitrogen atmosphere, 1383 g of totally de-salinized water were added. This starting substance was warmed on a water bath to an internal temperature of 73–75° C.

Under a nitrogen atmosphere, there is a first dosing added over 1 to 10 minutes comprising 141 g of desalinated water, 4. g Disponile SUS IC? 875; 328.8 g methymethacrylate, 0.3 ml sodium hydrogen sulfite (5% aqueous solution). Subsequently, there is added to the reactor a redox system comprising 2.3 ml sodium peroxodisulfate, (5% aqueous solution), 1.5 ml sodium hydrogen sulfite, (5% aqueous solution), which initiate the polymerization. As an observable consequence of dosing, internal temperature falls rapidly and then rises in the following 2–20 minutes above the initial temperature of 73–75° C. A temperature rise over 75–77° C. is prevented by cooling the reactor. A rapid drop in the internal temperature indicates the total completion of the reaction due to the first dosing. Thereafter a second emulsion comprising 140.9 g desalinated water, 4.4 g Disponile SUC IC? 875, 328.6 g methylmethacrylate and 0.2 ml of sodium hydrogen sulfite (5% aqueous solution) are added for 1–10 minutes under nitrogen atmosphere.

Again, there is an initial shop drop in temperature followed by a rise in the internal temperature. Here again, an increase in temperature over 75–77° C. is avoided by external cooling.

In case of a further drop in temperature due to substantially total cessation of reaction, there is added again under a nitrogen atmosphere a third emulsion at the rate of 55.4 g/minute, comprising 748.1 g of de-salinated water, 232 g Disponile SUC IC? 875, 1745 g methylmeth-acrylate, 1.68 ml sodium hydrogensulfite, 5% aqueous solution. After the beginning of the dosage the noted drop in temperature is somewhat weaker than in the first two cases. There is a general rise in the internal temperature to between 74–77° C. after 5–20 minutes. Again the internal temperature of this dosing is held, by cooling, to about 75° C. After completion of the addition of the emulsion, a post-reaction time of 30 minutes is provided at a water bath temperature of 75° C. The product is then cooled to room temperature, is filtered over a gauze filter and the dispersion spray-dried at an exit temperature of 75° C.

Products A, C and D are prepared in an analogous manner to Product B, subject however to variations of temperature, initiator amounts and feed speed yielding compounds of four different viscosities.

| Product | VZ = $\eta_{sp/c}$/ g/m³ | Temp ° C. | Initiator Amounts (5% aq. NaPeroxidisufate) | Dosage rate |
|---|---|---|---|---|
| A | 300 | 80 | 8.3 mL (Bisulfite: 5.4 mL) | 30 g/min |
| B | 995 | 75 | 2.3 mL (Bisulfite: 1.5 mL) | 55.4 g/min |

-continued

| Product | VZ = $\eta_{sp/c}$/ g/m³ | Temp °C. | Initiator Amounts (5% aq. NaPeroxidisufate) | Dosage rate |
|---|---|---|---|---|
| C | 1489 | 75 | 1.8 mL (Bisulfite: 1.2 mL) | 65 g/min |
| D | 1780 | 75 | 1.2 mL (Bisulfite: 0.8 mL) | 70 g/min |

The amount of sodium hydrogen sulfite solution is in a definite relationship to the amount of sodium peroxodisulfate. That is to say, when the amount of peroxodisulfate is doubled, the amount of the sodium bisulfite is similarly doubled.

Example 2

Production of the Plastisols

The polymers (Products A through D) are mixed with the softender Benzoflex 354? (2,2,4-trimethyl-1,3-pentandioldibenzoate, manufactured by Velsicol Chemical Corporation) and a filler Omya BSH (chalk, manufactured ty Omya Corporation) by means of a disperser under conditions which can be deduced from the following Information. For measurements of viscosity and shelf stability:

40 parts by weight of Polymer
60 Parts by weight Benzoflex 354?

For measurements of mechanical properties:

25 parts by weight of Polymer
45 parts by weight Benzoflex 354?
30 parts by weight Omya BSH.

Plastisol masses were applied with a wiper and held for 30 minutes at 140° in an electric oven. The viscosity of the plastisol pastes, as well as the gelation propetiesm were measured. Further, the tensile strength and the breaking extension of the gelled films were measured.

The measurement of the paste viscosity (Viskos [mPas]) were carried out on a Brookfield Viscosimeter in accordance with the protocols of DIN 53 018 Parts 1 and 2 and DIN 530 19 Part 1.

The tensile strength (Kg/cm²) as well as the breaking extension (%) of the gelled film we measured in accordance with DIN 53 455.

Comparative Example 1 of the table shows a pure suspension polymerisate based on MMA of Viscosity Number 250. The mean particle diameter was 15 μm.

Comparative Example 2 of the table shows a mixture of polymerisate from 60% emulsion suspension (VZ=300) and 40% suspension polymerisate (VZ=250). The mean particle diameter was 15 μm.

What is claimed is:

1. A plastisol comprising:
   I) At least one member of the group consisting of polymerisates and copolymerisates of (meth)acrylate by the polymerization of at least one monomer selected from the group consisting of:
      (A) 20 to 100 wt. % methylmethacrylate
      (B) 0 to 80 wt. % of (meth)acrylates different from methylmethacrylate, having formula I:

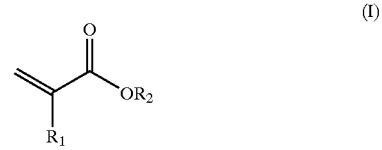

(I)

wherein
   $R_1$ is hydrogen or methyl, and
   $R_2$ is a linear or branched ($C_1$–$C_{18}$) alkyl residue
   (C) 0 to 40 wt. % of further monomers different from (A) and (B),
   (D) 0 to 40 wt. % of an adhesion improving monomer, wherein (A) through (D) yield 100 wt. % of the polymerizable components,
   II) A compatible softening agent in the proportion of 5 to 400 parts by weight, relative to 100 wt. % of component I,
   III) Inorganic fillers in the amount of up to 700 parts by weight, relative to 100 parts by weight of component I, wherein the mean molecular weight $M_w$ of component I is greater than 3,900,000 g/mol.

2. The plastisol of claim 1 wherein $R_2$ of the constituent of formula I of component I is linear or branch chained ($C_1$–$C_8$) alkyl.

The data are set forth in the following table.

| | Product A | Product B | Product C | Product D | Product E | Product E | Product G | Comp. 1 | Comp. 2 |
|---|---|---|---|---|---|---|---|---|---|
| $\eta_{sp/c}$(cm³/g) | 300 | 995 | 1489 | 1780 | 412 | 552 | 637 | 250 | 250/300 |
| $M_w$ 10⁻³ (g/mol) (GPC/Polystyrol standard) | 840 | 6500 | 7900 | 12800 | 1870 | 3130 | 3950 | 560 | — |
| Film Thickness (μm) | 3000 | 3000 | 3000 | 3000 | 3000 | 3000 | 3000 | 3000 | 3000 |
| Gelation 30 min/140° C. | + | + | + | + | + | + | + | +** | + |
| Viscosity (mPas) | | | | | | | | | |
| 1 hour | 27270 | 12890 | 11900 | 10090 | 25800 | 22400 | 15890 | 9870 | 14360 |
| 1 Day | 51200 | 17600 | 13420 | 11200 | 49800 | 45430 | 18230 | 12130 | 23010 |
| 2 Days | 59730 | 16670 | 15690 | 12200 | 53400 | 49600 | 19870 | 13400 | 27050 |
| 3 Days | 59800 | 18870 | 15340 | 12020 | 54100 | 51200 | 20450 | 13190 | 32200 |
| 6 Days | 59470 | 18330 | 15400 | 13890 | 53900 | 52400 | 27780 | 14050 | 32710 |
| Tearing Strength (kg/cm²) | 6 | 15 | 16 | 14 | 7 | 7 | 11 | 3 | 4 |
| Breaking Extension (%) | 349 | 339 | 321 | 325 | 354 | 342 | 332 | 389 | 410 |

*: VZ of the suspension polymerisate portion-250
**: Gelation succeeded completely for only at 30 minutes at 150° C.

3. The plastisol of claim 1 wherein the mean molecular weight $M_w$ of polymerised component I is greater than 3,900,000 g/mol.

4. A process of making plastisols by polymerising component I of claim 1 to yield a product having a mean molecular weight $M_w$ of greater than 3,500,000 g/mol.

5. The plastisol of claim 1 wherein said polymerisates or copolymerisates have chain lengths having a mean molecular weight $M_w$ of about 12,000,000.

6. The plastisol of claim 1 wherein said polymerisates or copolymerisates have a viscosity number $VZ \geq 600$.

7. The plastisol of claim 1 wherein said polymerisates or copolymerisates have a viscosity number $VZ > 900$.

8. The plastisol of claim 1 wherein said polymerisates or copolymerisates have a viscosity number $VZ > 1200$.

9. The plastisol of claim 1 wherein the monomer(s) of (A) and (B) are styrene, styrene derivatives, vinyl esters, maleic acid anhydride, itaconic acid, itaconic acid esters and olefins.

10. The plastisol of claim 1 wherein said adhesion improving monomer is selected from the group consisting of vinyl imidazoles, vinyl lactams, vinyl carbazoles and vinyl pyridines.

11. The plastisol of claim 1 wherein said inorganic fillers are in an amount of 9 to 700 parts by weight, relative to 100 parts by weight of component 1.

12. The process of claim 4 wherein said polymerizing is emulsion polymerizing.

13. The plastisol of claim 1 wherein the mean molecular weight $M_w$ is within a range of 3,950,000 to 12,800,000.

\* \* \* \* \*

UNITED STATES PATENT AND TRADEMARK OFFICE
CERTIFICATE OF CORRECTION

PATENT NO. : 6,498,209 B1
DATED : December 24, 2002
INVENTOR(S) : Loehden et al.

It is certified that error appears in the above-identified patent and that said Letters Patent is hereby corrected as shown below:

<u>Title page,</u>
Item [75], should read:

-- [75] Inventors: Gerd Loehden, Hanau (DE); Pavel Belik, Rodenbach (DE); Klaus Dorn, Hanau (DE); Natascha Schickel, Gelnhausen (DE); Mauren Traebing, Hanau (DE); Georg Schneider, Freigericht (DE) --

Item [63], Related U.S. Application Data should read:

-- Related U.S. Application Data

[63] Continuation -in-part of application No. 09/277,931, filed on Mar. 29, 1999, now abandoned. --

Signed and Sealed this

Twentieth Day of May, 2003

JAMES E. ROGAN
*Director of the United States Patent and Trademark Office*